(12) United States Patent
Battles et al.

(10) Patent No.: US 7,295,239 B2
(45) Date of Patent: Nov. 13, 2007

(54) USER INTERFACE ILLUMINATION SYSTEM

(75) Inventors: Amy E. Battles, Windsor, CO (US); James C. Dow, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 994 days.

(21) Appl. No.: 10/389,360

(22) Filed: Mar. 14, 2003

(65) Prior Publication Data

US 2004/0179133 A1 Sep. 16, 2004

(51) Int. Cl.
*H04N 5/222* (2006.01)
(52) U.S. Cl. .............................. 348/333.02; 348/333.04
(58) Field of Classification Search ........... 348/333.04, 348/333.02, 207.99; 396/88
See application file for complete search history.

(56) References Cited

U.S. PATENT DOCUMENTS

| | | | |
|---|---|---|---|
| 6,211,909 B1 * | 4/2001 | Maeshima et al. ..... | 348/207.99 |
| 6,240,239 B1 * | 5/2001 | Yu .............................. | 386/83 |
| 6,704,506 B2 * | 3/2004 | Sasagawa .................... | 396/88 |
| 6,850,700 B2 * | 2/2005 | Kazami ....................... | 396/60 |
| 7,057,651 B2 * | 6/2006 | Niikawa .................. | 348/240.1 |
| 2002/0146250 A1 * | 10/2002 | Stockton et al. ............ | 396/429 |
| 2003/0137596 A1 * | 7/2003 | Kaku ......................... | 348/364 |

* cited by examiner

Primary Examiner—Tuan Ho (57) ABSTRACT

A user interface illumination system provides a user with information regarding the operation of a digital camera. The system may provide a user interface for informing the user of the ability to select a particular function to be performed on the camera. The user interface has a set of input means disposed on the camera and a set of illumination sources associated with the input means. A controller controls the light-emitting characteristics of the illumination sources based upon current or available operating modes of the electronic device. For example, all input means that are operational in the current operating mode may be illuminated. The illumination may be different for different input means to suggest preferred functions to the user.

21 Claims, 6 Drawing Sheets

USER INTERFACE ILLUMINATION SYSTEM

BACKGROUND

Illumination sources are often provided on modern electronic devices. These illumination sources inform a user of a certain condition of the electronic device (e.g., illuminate if the device is turned "on", deactivate if the device is turned "off"). Illumination sources may also be integrated into various input means on an electronic device, such as push-buttons or keys, that allow a user to select a function for the device to perform. Such input means may have a fixed function or a "soft" or dynamic function depending on their configuration. For example, a digital camera may have a fixed function push-key, such as the shutter key, and a soft function push-key, such as a confirmation key. The shutter key performs the single function of taking a image and the confirmation key allows the user to confirm a variety of commands for the device to perform based on information presented to the user. Additionally, many electronic devices have a display area presenting the user with information about one or more functions performed by the device. Such information could be in the form of a textual display, illumination, or other forms of information display. Depending on the device functionality, it may have any number of light sources, push-keys and/or display areas from which a user can input commands or obtain information.

Unfortunately, not all electronic devices have display areas configured to provide the user with sufficient information about the current status of the device or the availability of the device to perform a function. Even if such displays are present, they may be too small for the user to easily navigate. Some devices also have such a large number of push-keys that users may find it difficult to efficiently operate the device and to understand the consequences of initiating input through a key. In sum, these shortcomings limit the ability to feedback information about the state of the device to the user.

A user interface illumination system is described that provides information to a user regarding the operation of an electronic device. In one aspect, the system provides a user interface to inform the user of the ability to select a particular function to be performed on an electronic device. The interface provides a set of input means disposed on the electronic device, a set of illumination sources associated with the input means, and a controller that controls the light-emitting characteristics of the illumination sources based upon current or available operating modes of the device. For example, all input means that are operational in the current operating mode may be illuminated. The illumination may be different for different input means to suggest preferred functions, etc. to the user.

DETAILED DESCRIPTION OF THE INVENTION

Figure 1:
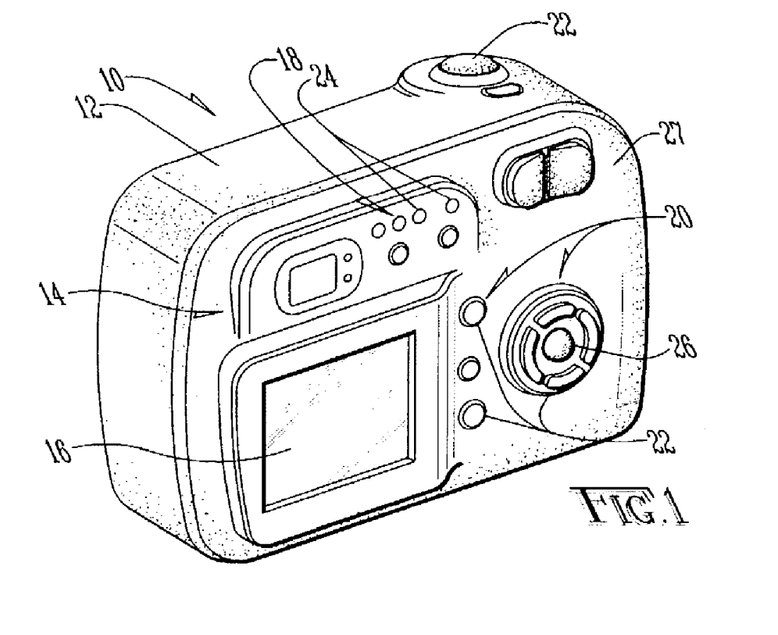
FIG. 1 is a perspective view of an electronic device.

FIG. 1 shows a user interface illumination system 10 with an electronic device such as a digital camera 12 having a user interface 14. The user interface 14 includes a display screen 16, a plurality of light sources 18, and a plurality of input means 20 disposed thereon. The input means 20 may be a toggle switch, joystick-type lever, or similar arrangement, and is preferably an input key 22. The input keys 22 initiate certain commands to be performed by the camera 12, for example, capturing an image. Each input key 22 is provided with an associated light source 24 formed on or adjacent to the input key 22. The light sources may be miniature light bulbs, LEDs (light emitting diodes), or low power semiconductor lasers, e.g., surface emitting lasers. Global change "light sources" for light sources (and light source for illumination) 18 and input key light sources 24 are controlled by a controller to provide distinct illumination characteristics representing various operating modes to guide a user in operating the camera 12. For example, light sources 18 present the user with information regarding an operating status of the camera 12, and input key light sources 24 inform the user of functions that may be performed by initiating the associated input keys 22.

Two separate light sources may be provided for each key as will be described in greater detail below, with each of these light sources emitting different color light. As an illustration, LEDs having dimensions on the order of 4 mm or less would make it possible to position two such LEDs behind a key which is approximately 8 mm wide. The different color LEDs could be selectively illuminated as will be describer below.

By selectively illuminating one or more of the light sources, the associated input key will be identified to the user. By illuminating only those keys that provide valid responses for any given operation, the operator is guided through the proper operation of the camera without referring to the written manual or user's guide. Moreover, by identifying the proper keys to accomplish a particular menu command sequence, the user may more quickly complete the menu selection and is less likely to initiate an undesired command by pressing a wrong key.

Each input key 22 has a fixed or dynamic functionality depending on the features incorporated into the digital camera 12. Input keys 22 with dynamic functionality allow for the initiation of multiple commands, the specific command depending on the current operating mode of the camera 12. As an example, the camera 12 preferably has a menu-control key 26 for scrolling through menus provided on display screen 16 and further acts as a confirmation or "OK" key for confirming selections made on the menus. Additionally, some commands may require the initiation of more than one input key 22 in a sequence.

Figure 2:
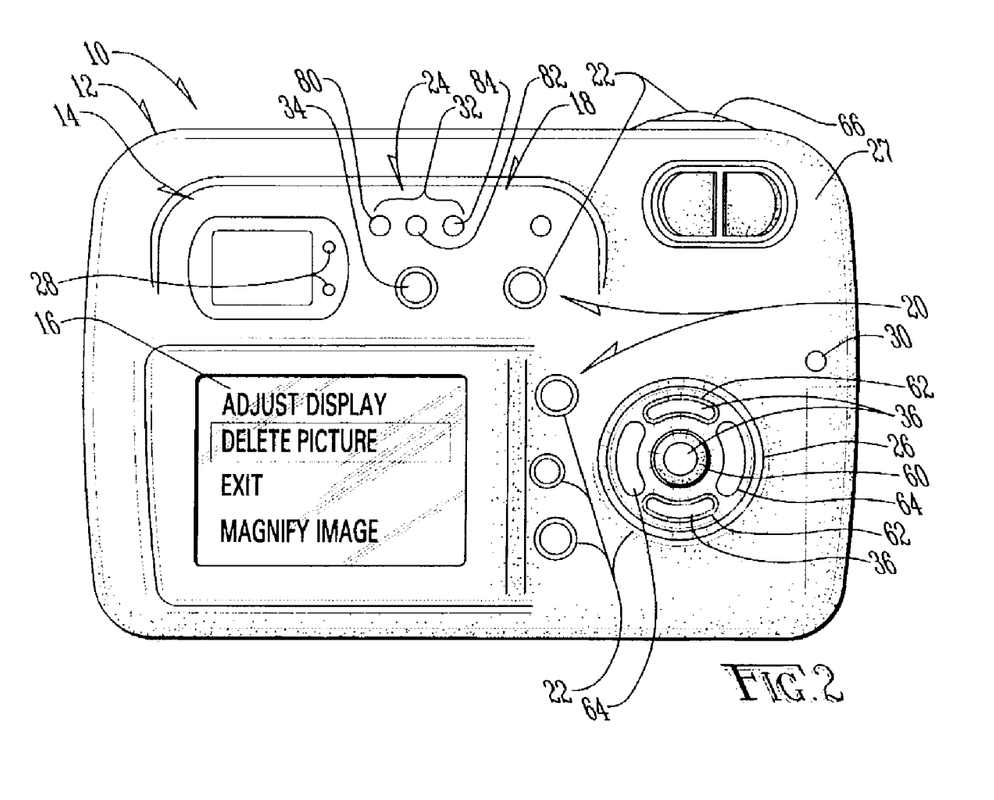
FIG. 2 is a rear elevational view of the electronic device of FIG. 1

A closer view of a back surface 27 of the camera 12 may be seen in FIG. 2. Camera 12 has various light sources 18, such as viewfinder light sources 28 and a power/memory light source 30, and various input-key light sources 24, such as flash-control light sources 32 associated with a flash key 34 and a menu-controller light source 36 associated with the menu control keys 26. The light sources 18, 24 may be configured to emit light of varying illumination levels (e.g., intensity, flashing or variable illumination, no illumination), varying durations of illumination, as well as varying colors. Each illumination characteristic of the light sources informs the user of current or available operating modes of the device.

Figure 3:
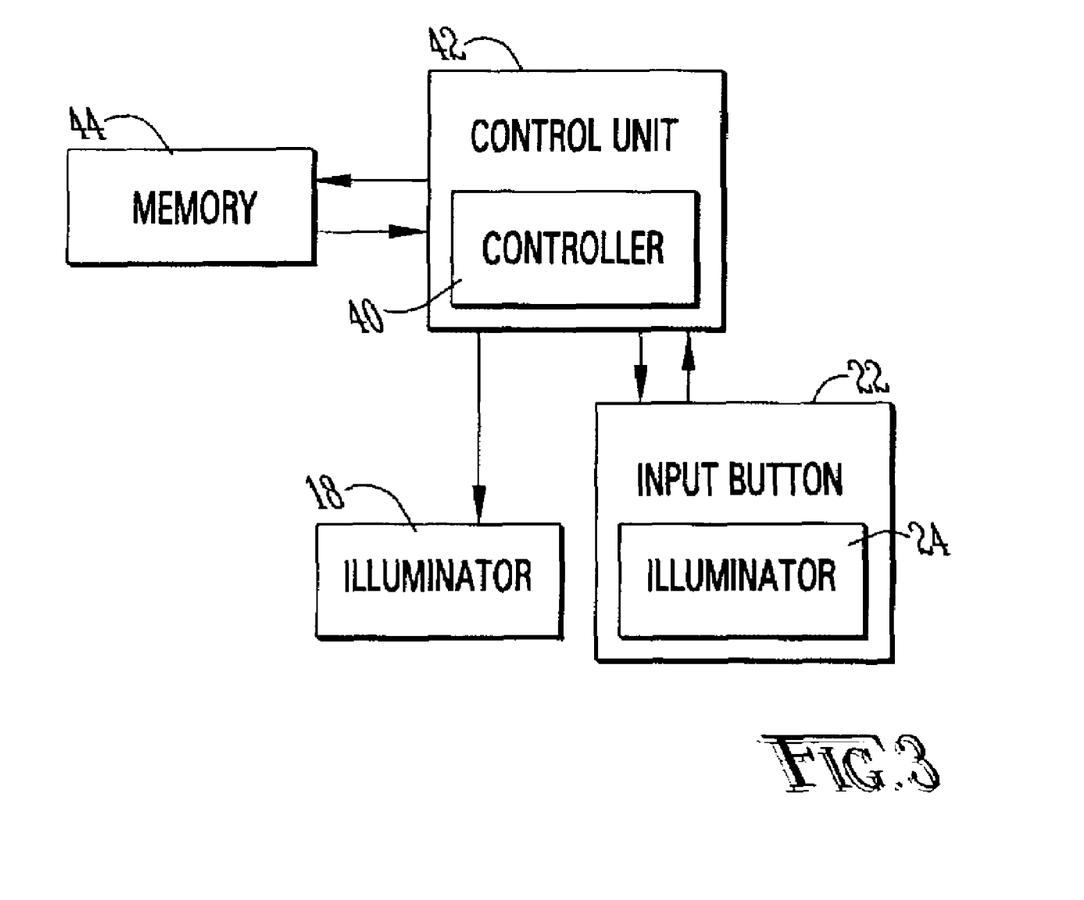
FIG. 3 is a schematic block diagram of the components of the electronic device involved in illumination control.

A schematic block diagram is shown in FIG. 3 representing the camera 12 components involved in illumination control. A controller 40 regulates the illumination sequences and characteristics of light sources 18 and input-key light sources 24. The controller 40 may comprise a data processor, for example, a model SPLB21 8-bit CMOS microprocessor of Sunplus Technology Co and preferably is incorporated into a control unit 42 that controls the full operation of the camera 12. Alternatively, the controller 40 may be embodied in a dedicated user interface processor. The camera 12 also includes memory 44 for storing a set of functions for the camera 12 to perform upon receiving commands through the input keys 22. The memory 44 is in communication with the control unit 42 such that user initiation of an input key 22 is received by the control unit 42 and the control unit 42 queries the memory 44 to determine the function associated with the input key 22. Based on that function, the controller 40 determines the appropriate light sources 18 and/or input key light sources 24 for illumination, as well as the appropriate illumination characteristics, and sends a signal to the respective light sources 18, 24 to initiate the specified illumination.

Figure 4:
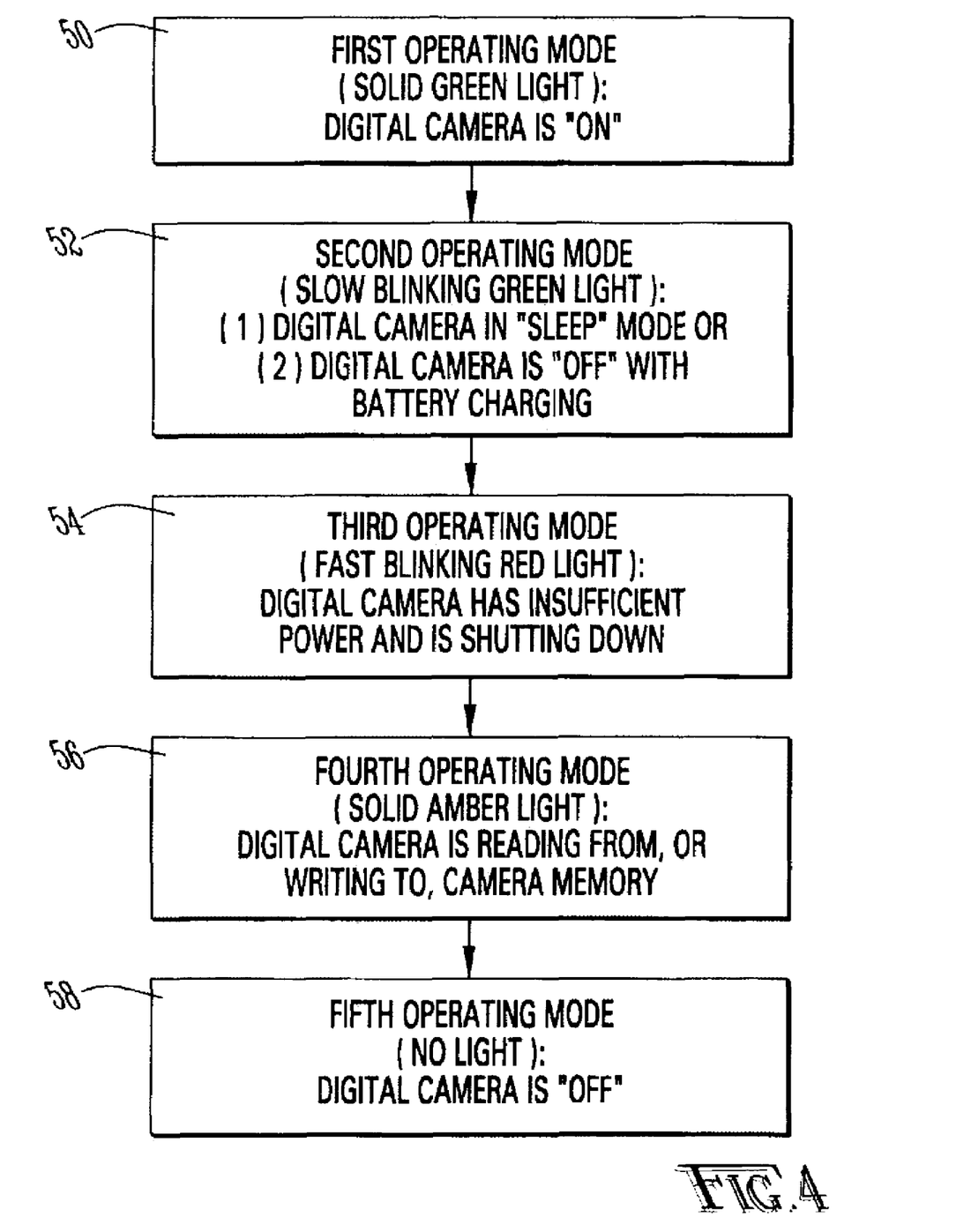
FIG. 4 is a diagram showing the operating modes of one light source of the electronic device.

One exemplary illumination sequence for an light source 18, namely power/memory light source 30, includes five different illumination sequences, as shown in FIG. 4. In a first operating mode 50, light source 30 has a first illumination characteristic, for example a solid green light, to indicate to the user that the digital camera 12 is turned on. A second illumination characteristic in the form of a slow blinking green light emitted by light source 30 informs the user that a second operating mode 52 has been entered and that the camera 12 is in a "sleep" mode. In a third operating mode 54, light source 30 has a distinct a third illumination characteristic, such as a fast blinking red light that indicates to the user that the camera 12 has insufficient power for operation and is shutting down. A fourth illumination characteristic for the light source 30 for example a solid amber light is actuated when the camera 12 is in a fourth operating mode 56, which indicates to the user that the camera 12 is reading from, or writing to, a camera memory unit, such as a memory card. Finally, in a fifth operating mode 58, light source 30 has a fifth illumination characteristic, such as no illumination or a red light, to indicate to the user that the camera 12 is turned off.

Figure 5A:
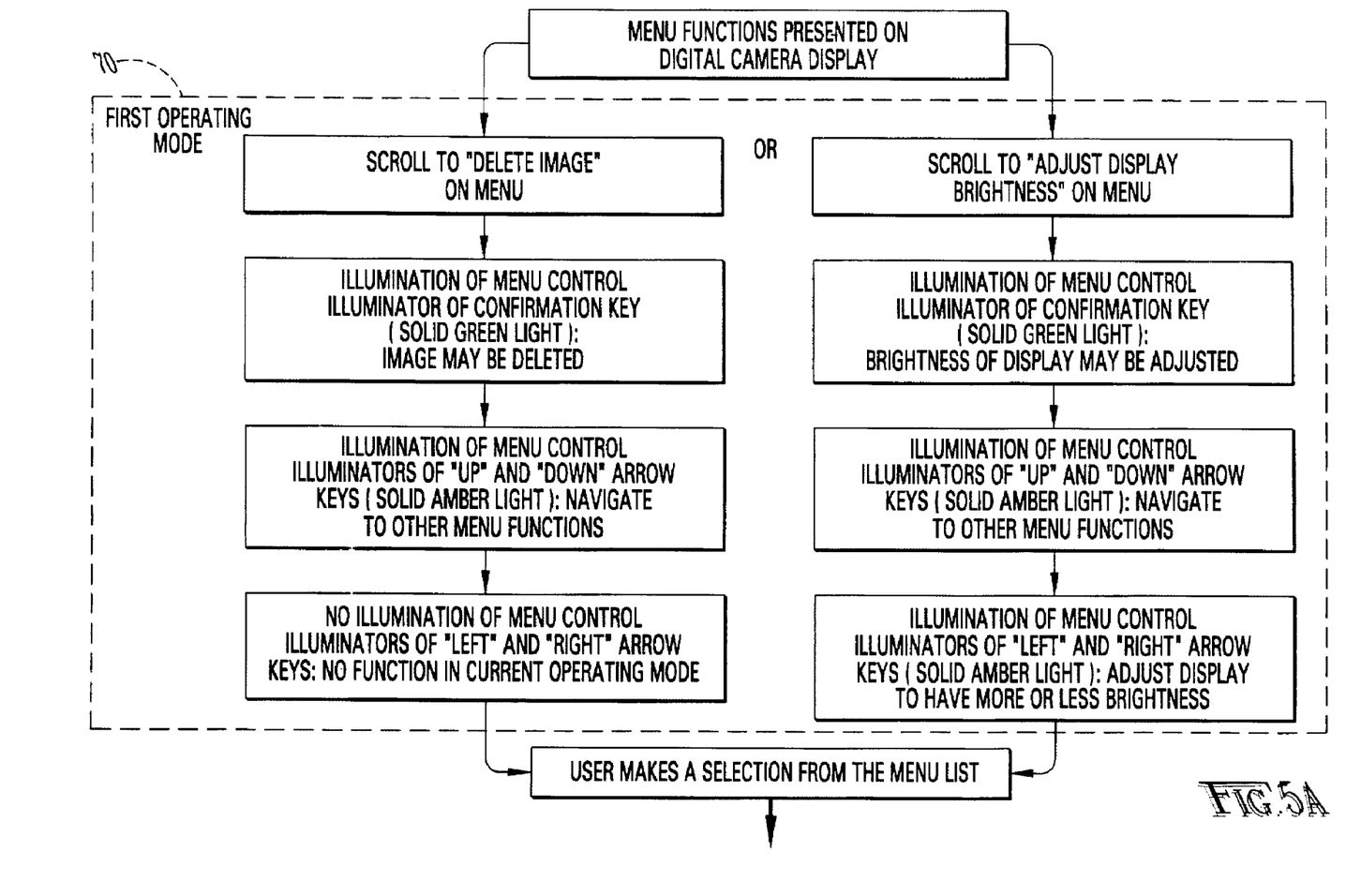
FIG. 5 is a diagram showing the operating modes of one input key light source of the electronic device.

FIG. 5A shows another exemplary illumination sequence for light sources 24 associated with input keys 22, such as menu-controller light sources 36 associated with menu control key 26. As seen in FIG. 3, menu control key 26 are formed with a confirmation key 60, as well as "up" and "down" directional arrow keys 62 and "left" and "right" directional arrow keys 64. The arrow keys 62, 64 preferably are disposed around the confirmation key 60. Each of the keys 60, 62, 64 has an associated menu control light source 36 and each key initiates an input command.

In a first operating mode 70, the display screen 16 presents a menu of preprogrammed functions that may be selected by the user. The particular list displayed by the menu may vary based on the current or previous activity of the digital camera 12. For example, the menu list may include functions such as adjusting the display brightness, deleting an image, exiting the particular menu, and magnifying an image, as shown on display screen 16 of FIG. 2. The user scrolls through the list using the "up" and "down" direction arrow keys 62 of the menu control key 26. At this point, the menu-control light source 36 of confirmation key 60 has a first illumination characteristic, such as a solid or blinking green light, to indicate that the selected menu function (e.g., delete image in FIG. 2) may be confirmed. The menu control light sources 36 of the "up" and "down" direction arrow keys 62 have a second illumination characteristic, for example a solid amber light, to indicate that such arrow keys may be used to navigate to another menu function (e.g., adjust display). The menu control light sources 36 for the "left" and "right" direction arrow keys 64 have a third illumination characteristic, such as no illumination or red illumination, to indicate that such arrow keys are not functional in the current operating mode.

Other alternative illumination characteristics may be realized in the first operating mode 70. For example, if the selected menu function is "adjust display brightness", the menu control light sources 36 of the "left" and "right" direction arrow keys 64 may have an illumination characteristic similar to that of the light sources 36 of the "up" and "down" direction arrow keys 62 (e.g., solid amber light); this illumination characteristic indicates that such "left" and "right" direction arrow keys 62 may be initiated to adjust the brightness of the display screen 16. In another example, if "exit" is the selected menu function, the menu control light source 36 of the confirmation key 60 may have yet another illumination characteristic, such as a flashing red light, to warn the user that key 60 initiation will exit the current menu list.

Figure 5B:
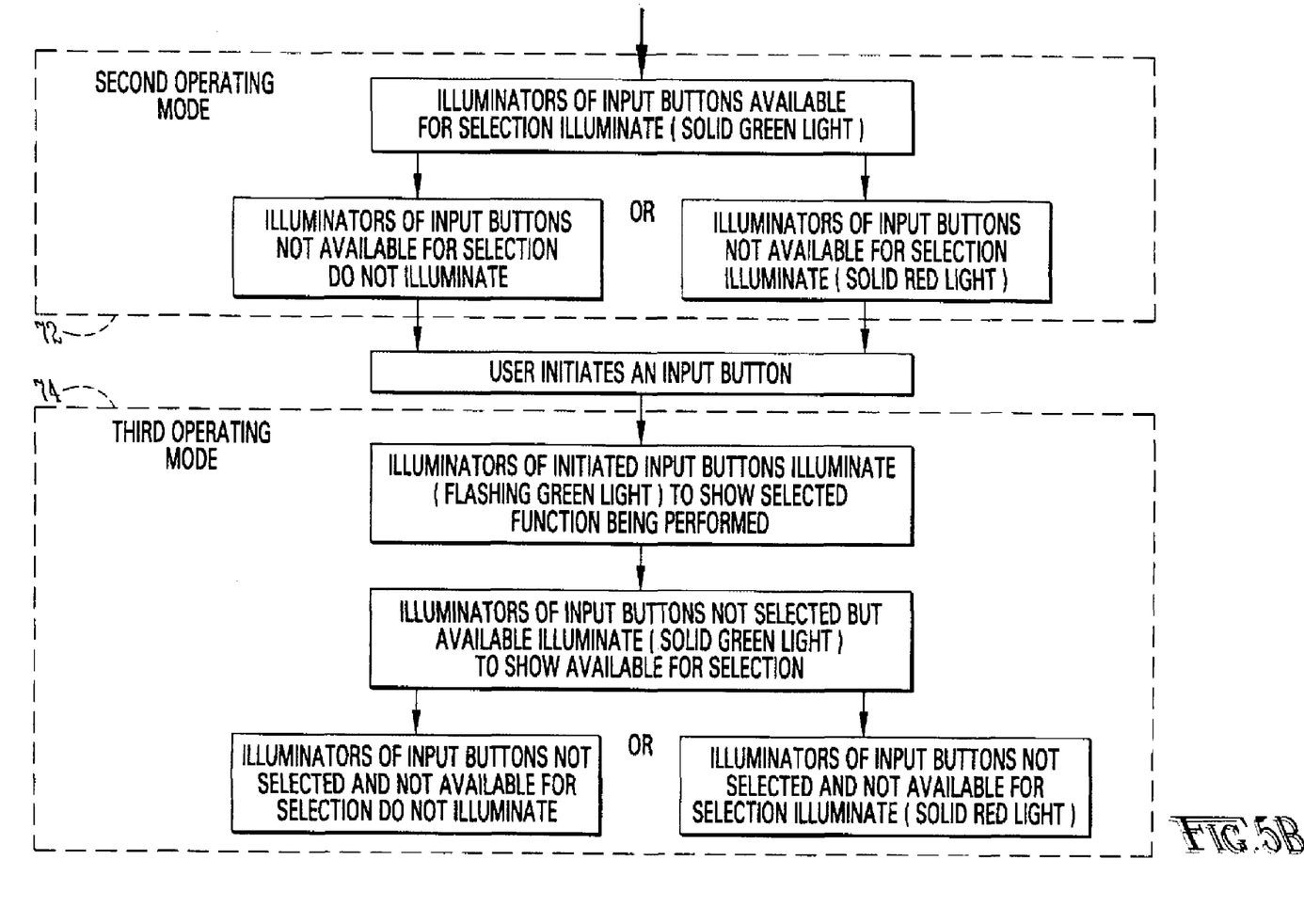

Once the user has completed inputting commands related to the selected menu items, a second operating mode 72 is realized in FIG. 5B. At this point, input key light sources 24 associated with input keys 22 that are available for selection have a first illumination characteristic, for example a solid green light. For example, a shutter key 66 of FIG. 2 may illuminate in such fashion to inform the user that such key is available to perform the function of capturing an image. Conversely, light sources 24 associated with input keys 22 that are not available for selection may have a second illumination characteristic, for example a solid red light or no illumination.

In a third operating mode 74, subsequent to the user initiating one or more input keys 22, light sources 24 associated with selected input keys 22 emit light having a first illumination characteristic. The first illumination characteristic of the third operating mode 74 comprises light sources 24 associated with input keys 22 the selected emitting light of variable illumination (e.g., flashing green light). This illumination characteristic informs the user that the digital camera 12 is currently "busy" performing a function selected on the associated input key 22. Light sources 24 associated with non-selected input keys 22 have a second illumination characteristic (e.g., solid green light) indicating that the input key is available for selection or a third illumination characteristic (e.g, solid red light or no illumination) indicating that the input key is not available for selection.

Figure 6:
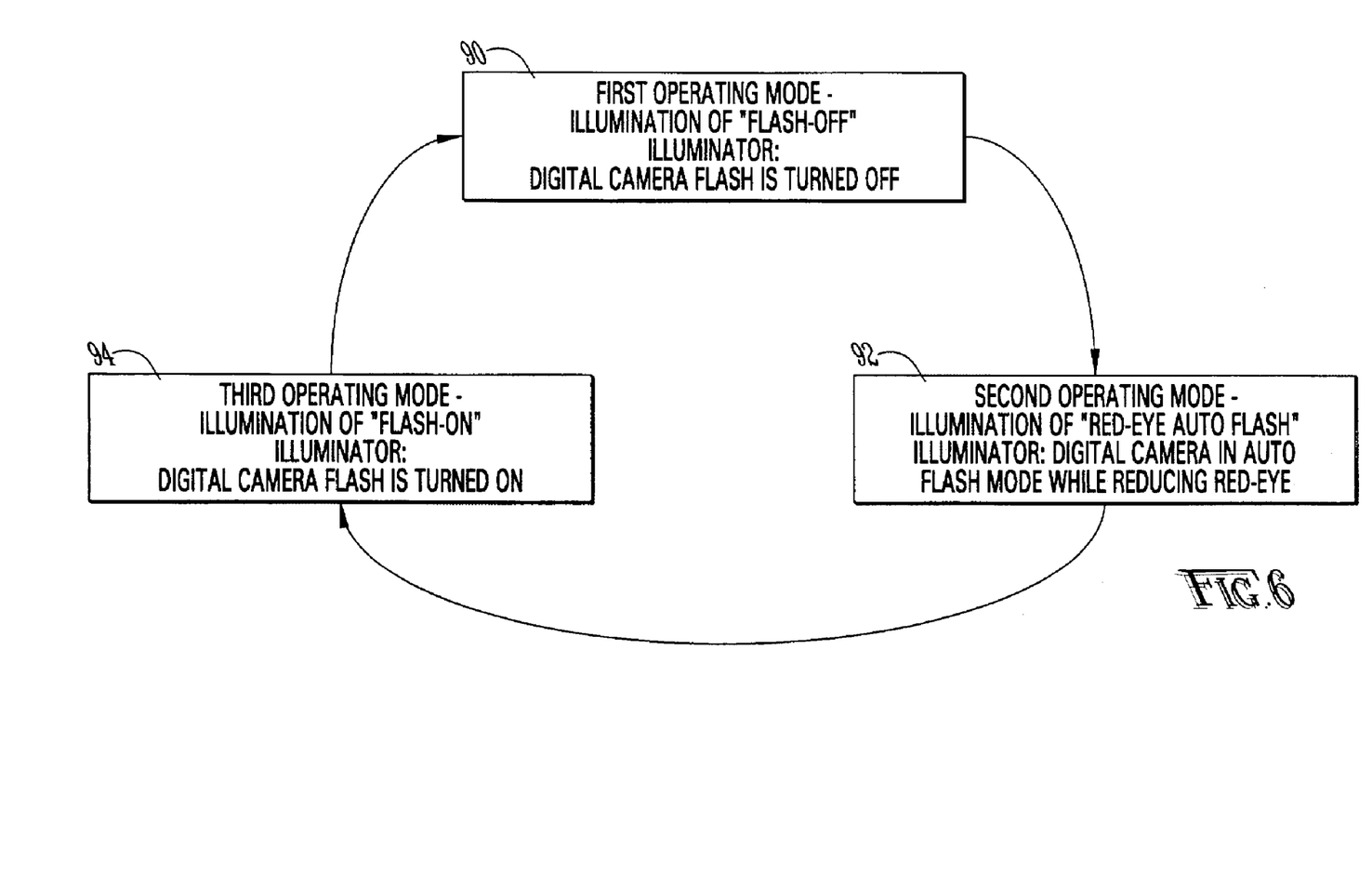
FIG. 6 is a diagram showing the operating modes of another input key light source of the electronic device.

Yet another exemplary illumination sequence is shown in FIG. 6. This illumination sequence is for the flash-control light sources 32 associated with the flash-control key 34, namely a "flash-off" light source 80, a "red-eye auto flash" light source 82, and a "flash-on" light source 84 shown in FIG. 2. When the user initiates a selection on the flash-control key 34, light sources 80, 82, 84 emit light according to a sequence. While one of the light sources 80, 82, 84 is illuminated, the other light sources 80, 82, 84 are without illumination. The user depresses the flash control key 34 to enter a first operating mode 90 having a first illumination characteristic in the "flash-off" light source 80, such as a solid amber light. The first illumination characteristic of the light source 80 indicates that the camera flash is not available for use when capturing an image. A subsequent flash control key 34 depression may bring about a second operating mode 92 having a second illumination characteristic, for example a solid amber light in "red-eye auto flash" light source 82, to indicate that the digital camera 12 will automatically initiate a flash when capturing an image while reducing so called "red-eye" in the image. Still another flash control key 34 depression initiates a third operating mode 94. This mode provides a third illumination characteristic in the "flash-on" light source 84, for example a solid amber light, to indicate that the camera flash is available for activation when capturing an image. Although each of the light sources 80, 82, 84, may emit light of the same color, they may also emit light of varying colors from each other, and with varying illumination levels and durations.

From the foregoing information, it should now be obvious that the user interface illumination system aids a user in operating an electronic device in a more efficient manner. By giving the user visual indicators for differentiating between various input means 20 and the available functions that may be performed on the electronic device by initiation of such input means, the user may be more able to correctly navigate the device and perform desired tasks. While certain forms of the present invention have been illustrated and described herein, it is not to be limited to the specific forms or arrangement of parts described and shown.

What is claimed is:

1. A user interface for assisting a user in the operation of a camera, the user interface comprising
   at least one input key disposed on the camera, each of said at least one input key corresponding to at least one particular function performed by the camera;
   at least one illumination source formed on or adjacent to each of the at least one input key, such that the at least one illumination source has more than three light-emitting characteristics; and
   a controller for controlling the light emitting characteristics of the at least one illumination source;
   the at least one illumination source being illuminated upon the controller determining when the associated at least one input key is available to provide input direction to the camera.

2. The user interface of claim 1, further comprising a plurality of secondary illumination sources configured to provide a series of illumination characteristics each indicative of a certain status of the camera.

3. The user interface of claim 2, wherein the series of illumination characteristics for each secondary illumination source comprise the emission of two or more colors of light.

4. The user interface of claim 2, wherein the series of illumination characteristics comprise the emission of light of essentially constant intensity for a period of time and the intermittent emission of light for a period of time.

5. The user interface of claim 1, wherein the illumination source of at least one of the at least one input key is configured to emit two or more colors of light.

6. The user interface of claim 5, wherein the at least one input key comprises two or more input keys and wherein the illumination source of one of the input keys is configured to emit a color of light varying from the color of light emitted by the illumination source of the other input key.

7. The user interface of claim 6, wherein the camera displays a menu of the available function selections, and the controller illuminates the illumination source of one of the two or more input key with a first color when such input key is available to select a specific function from the menu, and illuminates the illumination source of another one of the two or more input keys with a second color unique from the first color when the input key is inoperable for the specific function from the menu being performed.

8. The user interface of claim 6, wherein a first input key of the two or more input keys has a plurality of illumination sources associated therewith, and wherein the camera displays a menu of the available function selections, the controller illuminating the illumination sources of the first input key with a first color when such input key is available to select a specific function from the menu, and illuminating the illumination source of a second input key of the two or more input keys with a second color distinct from the first color when the second input key is inoperable for the specific function being performed.

9. A method for guiding a user in selectively operating a camera, the camera having a set of illuminatable interface keys for initiating functions on the camera, the method comprising the steps of:
   storing a set of functions in the camera, each function of the set of functions being associated with the activation of at least one particular input key of the set of illuminatable interface keys; and
   selectively illuminating, in response to user input to the camera, at least one particular input key capable of performing a specific function of the set of functions to indicate which at least one particular input key must be activated to perform the specific function.

10. The method of claim 9, further comprising the step of providing the at least one particular input key with varying illumination levels upon the user selecting the at least one particular input key to initiate the associated function.

11. The method of claim 9, wherein the step of selectively illuminating at least one particular input key comprises illuminating the at least one particular input key with a first illumination color, the method further comprising the step of illuminating the particular input key with a second illumination color upon the user selecting the input key to initiate the associated function.

12. The method of claim 9, wherein the step of selectively illuminating at least one particular input key comprises illuminating the at least one particular input key with a color of illumination varying depending on the particular user input to the camera.

13. The method of claim 9, wherein the set of functions stored in the camera is stored in a menu, and the step of selectively illuminating at least one particular input key further comprises simultaneously displaying at least a portion of the menu on a display region of the camera.

14. The method of claim 9, wherein the step of selectively illuminating at least one particular input key further comprises selectively illuminating, in response to the user input to the camera, a second at least one particular input key capable of performing a different specific function of the set of the functions to indicate which particular at least one key must be activated to perform the additional function.

15. The method of claim 12, wherein the at least one particular key is illuminated with a different color than the second at least one particular key.

16. The method of claim 14, wherein the at least one particular key and the second at least one particular key are each illuminated by light sources capable of emitting different colors, the color of illumination depending on the particular user input to the electronic device.

17. A method for instructing an operator of a camera the functionality of a set of interface keys on the camera, the method comprising the steps of:

storing a set of functions in the camera, each function of the set of functions being associated with the activation of at least one particular input key of the set of interface keys; and selectively illuminating, in response to user input to the camera, at least one particular input key capable of performing a specific function of the set of the functions to indicate which particular at least one key must be activated to perform the specific function.

18. The method of claim 17, further comprising the step of providing the at least one particular input key with varying illumination levels upon the user selecting the at least one particular input key to initiate the associated function.

19. The method of claim 18, wherein the step of selectively illuminating at least one particular input key comprises illuminating the input key with a first illumination color, the method further comprising the step of illuminating the particular input key with a second illumination color upon the user selecting the input key to initiate the associated function.

20. The method of claim 18, wherein the step of selectively illuminating at least one particular input key comprises illuminating the input key with a color of illumination varying depending on the particular user input to the camera.

21. The method of claim 18, wherein the set of functions stored in the electronic device are stored in a menu, and the step of selectively illuminating at least one particular input key further comprises simultaneously displaying at least a portion of the menu on a display region of the camera.

* * * * *

UNITED STATES PATENT AND TRADEMARK OFFICE
CERTIFICATE OF CORRECTION

| | | |
|---|---|---|
| PATENT NO. | : 7,295,239 B2 | Page 1 of 1 |
| APPLICATION NO. | : 10/389360 | |
| DATED | : November 13, 2007 | |
| INVENTOR(S) | : Amy E. Battles et al. | |

It is certified that error appears in the above-identified patent and that said Letters Patent is hereby corrected as shown below:

In column 1, line 38, below "user." insert -- SUMMARY OF THE INVENTION -- (as heading).

In column 5, line 65, in Claim 7, delete "key" and insert -- keys --, therefor.

Signed and Sealed this

Thirteenth Day of May, 2008

JON W. DUDAS
*Director of the United States Patent and Trademark Office*